(12) United States Patent
Rodriguez et al.

(10) Patent No.: US 7,103,176 B2
(45) Date of Patent: Sep. 5, 2006

(54) DIRECT COUPLING OF TELEPHONE VOLUME CONTROL WITH REMOTE MICROPHONE GAIN AND NOISE CANCELLATION

(75) Inventors: Herman Rodriguez, Austin, TX (US); Randolph Michael Forlenza, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 131 days.

(21) Appl. No.: 10/844,638

(22) Filed: May 13, 2004

(65) Prior Publication Data

US 2005/0254639 A1   Nov. 17, 2005

(51) Int. Cl.
*H04M 1/19* (2006.01)
(52) U.S. Cl. .......................... 379/392.01; 379/390.01; 381/105
(58) Field of Classification Search ........... 379/390.01, 379/433.06, 392.01; 381/105
See application file for complete search history.

(56) References Cited

U.S. PATENT DOCUMENTS

| 561,423 | A | * | 6/1896 | Minnis ................. 379/433.01 |
| 4,773,088 | A | | 9/1988 | Matheny ..................... 379/395 |
| 5,150,404 | A | | 9/1992 | Jordan ......................... 379/155 |
| 5,867,573 | A | | 2/1999 | Wittman ..................... 379/387 |
| 6,061,431 | A | * | 5/2000 | Knappe et al. ............. 379/347 |
| 6,304,654 | B1 | | 10/2001 | Wittman ..................... 379/387 |
| 6,504,926 | B1 | * | 1/2003 | Edelson et al. ........ 379/390.01 |

FOREIGN PATENT DOCUMENTS

| JP | 2001192560 | 6/2001 |
| WO | WO 9818238 A1 * | 4/1998 |

* cited by examiner

*Primary Examiner*—Daniel Swerdlow
(74) *Attorney, Agent, or Firm*—Jeffrey S. LaBaw; Darcell Walker (57) ABSTRACT

The present invention creates a method, apparatus and system by which a telephone unit volume control provides instantaneous coupling to and controlling of a connected telephone unit's microphone gain and noise cancellation circuitry. With this invention, an increase in the volume control on the first unit, will result in an automatic adjustment of the second unit's microphone gain control. This microphone gain adjustment is an amount corresponding to the adjustment of the volume of the first unit. The noise cancellation circuitry on the second unit is adjusted to filter more of the background noise before transmission instead of after the receipt of the signal at the destination telephone.

18 Claims, 8 Drawing Sheets

DIRECT COUPLING OF TELEPHONE VOLUME CONTROL WITH REMOTE MICROPHONE GAIN AND NOISE CANCELLATION

FIELD OF THE INVENTION

The present invention relates to a method, apparatus and system for enhancing the quality of the telephone communication between parties and more particularly to a method, apparatus and system for telephone volume control and signal noise reduction during a telephone conversation by instantaneously controlling microphone gain and noise cancellation circuitry within a telephone.

BACKGROUND OF THE INVENTION

Various telephone arrangements have been implemented to assist hearing-impaired persons when they are using a telephone. For example, a well known device has been a magnetic pickup coil connected to a hearing aid, which could be attached to a certain marked location on the handset and provide the hearing impaired person with a satisfactory hearing level.

Another aid has been a telephone handset with a receiver amplifier and a volume control in the form of a potentiometer. It is well known to provide a telephone amplifier in the handset of a conventional telephone to vary the amplitude of audio signals received from the telephone subset using a potentiometer. Generally, an amplifying receiver and a volume control in the form of a potentiometer are located in the handset and a user varies the receiver volume to suit the user's need by rotating the potentiometer. A handset amplifier of the above-described general type is disclosed in U.S. Pat. Nos. 4,151,376 and 3,254,160. Another telephone handset amplifier disclosed in U.S. Pat. No. 4,466,120 utilizes a rocker switch located in the handset to control the amplifier to vary the receiver volume. U.S. Pat. No. 4,773,088 describes a telephone handset amplifier circuit for receiving and amplifying an audio signal from a telephone subset by varying amounts based on the duration of operation of a switch and for converting the amplified audio signal into audible sound. The amount of amplification is determined by a variable impedance element such as a FET. An RC circuit controls the impedance of the FET based on the state of the switch and the level of a supply voltage generated in the transmitter portion of the circuit. An electret condenser microphone regulates or stabilizes the supply voltage and provides improved linearity and low transmitter distortion.

U.S. Pat. Nos. 5,867,573 and 6,304,654 describe a telephone handset interface that reduces or eliminates feedback-induced singing in a telephone handset/hybrid loop. The interface provides for user selectable volume control settings, each setting representing an amount of gain or loss to be applied to the transmit and receive signals within the telephone set. The gain settings are selected to limit overall loop gain so as to reduce or eliminate any tendency of the handset to sing at high receive gain levels. Loss inserted into the transmit circuit is removed when user speech is detected in the transmit circuit. The handset interface is preferably constructed as an electronic circuit controlled by a microprocessor. The handset interface contains a volume control circuit which allows the telephone user to vary up or down the amount of gain applied to the receive and transmit signals passing between the handset and the hybrid, thus affecting the amplitude of the signals which ultimately pass through tip and ring between the telephone user and a caller on the far end of the call. Although this handset provides improvements in volume and noise control during a telephone call, this device only works with one party to a telephone.

Current telephones allow a user to alter the unit's volume control to adjust for different acoustics, hearing levels, and physical environments. However, the current technology is not user-friendly in cases where at least one of the parties in a telephone conversation is hearing impaired or speech impaired, since it may be difficult for one party to hear the complete message of the other. For example, when a hearing impaired person is attempting to listen on the telephone, often the conversation is interrupted by requesting louder repetition of the last statement, while at the same time increasing the volume on the recipient's handset.

What is needed is a method, apparatus and system to enable a first party of a telephone conversation to increase the volume control of the first party's handset, while simultaneously increasing the microphone gain of the second party's handset. Thus, optimal gain and noise cancellation takes place at the source, instead of only increasing the volume on the receiving side, which would also increase any transmitted background noise. With a new product of this nature, a hearing impaired or speech impaired person can conduct a telephone conversation in a more natural way, without having to request the other party to speak louder (or softer) as required, or increasing the volume that also includes background noise from the other party.

SUMMARY OF THE INVENTION

It is an objective of the present invention to provide a method, apparatus and system to enhance the quality of a telephone call between parties, especially when one or more of the parties have a hearing impairment.

It is a second objective of the present invention to provide a method, apparatus and system to automatically adjust the volume of a party's handset in response to the adjustment of the microphone gain of other party's handset.

It is a third objective of the present invention to provide a telephone system that can detect a volume adjustment of the party to a telephone call and transmit a signal to the other parties to the call such that their microphone gain is adjusted according to and in response to the volume adjustment of a party.

It is a fourth objective of the present invention to provide a method, apparatus and system that can adjust the microphone gain and noise cancellation of a telephone signal prior to transmission of the signal to the recipient party.

It is a fifth objective of the present invention to provide a telephone communication method, apparatus and system in which microphone gain adjustment and noise cancellation of one telephone are coupled with the volume control adjustment of the connected telephone.

It is a sixth objective of the present invention to provide a method, apparatus and system that reduces transmitted background noise when increasing the microphone gain of the transmitted signal.

It is a seventh objective of the present invention to a method, apparatus and system in which telephone party can adjust parameters of a telephone in accordance with the preferences of that particular party.

The present invention creates a method by which a telephone unit volume control provides instantaneous coupling to and controlling of a connected telephone unit's microphone gain and noise cancellation circuitry. With this invention, an increase in the volume control on the first unit results in an automatic adjustment of the second unit's microphone gain control. This microphone gain adjustment corresponds to the adjustment of the volume of the first unit. The noise cancellation circuitry on the second unit is adjusted to filter more of the background noise before transmission. The microphone gain adjustment and noise cancellation of a signal occurs prior to transmission instead of after the signal reaches the destination telephone reduces the amount of noise in the signal that is amplified when the volume of the telephone receiving the signal is adjusted.

For this disclosure, the term "microphone gain" includes the adjustment of the microphone input gain value and the degree of background noise cancellation filtered out. The degree of the microphone gain adjustment is controlled by the speed and repeat count in which the first unit increases or decreases the volume control. Thus, a simple tap on the volume control of the first unit is used to increase the microphone gain of the second telephone unit by a small amount. On the other hand, increasing and holding the volume control for an extended period on the first telephone unit will substantially increase the microphone gain on the second unit, to a greater extent than in the first case.

In the present invention, a connection is established between the parties to the telephone call in a conventional manner. After this connection is established, a party can transmit a signal containing the initial volume setting to the connected telephone. The microphone gain at the receiving telephone is adjusted to correspond to the volume setting of the sending telephone. The microphone gain adjustment of the receiving telephone is directly proportional to the volume adjustment of the sending telephone. In the alternative, there can be a default initial volume setting. In the case of a default setting, when one connected party adjusts the volume, this volume adjustment is detected and automatically sent to the other connected telephone party. Upon receipt of this adjustment, the receiver microphone gain is adjusted in response to the adjustment of the caller telephone. In addition, the noise reduction circuitry of the telephones adjusts to filter larger amount of noise that may be generated from a higher telephone volume.

DETAILED DESCRIPTION OF THE INVENTION

Figure 1:
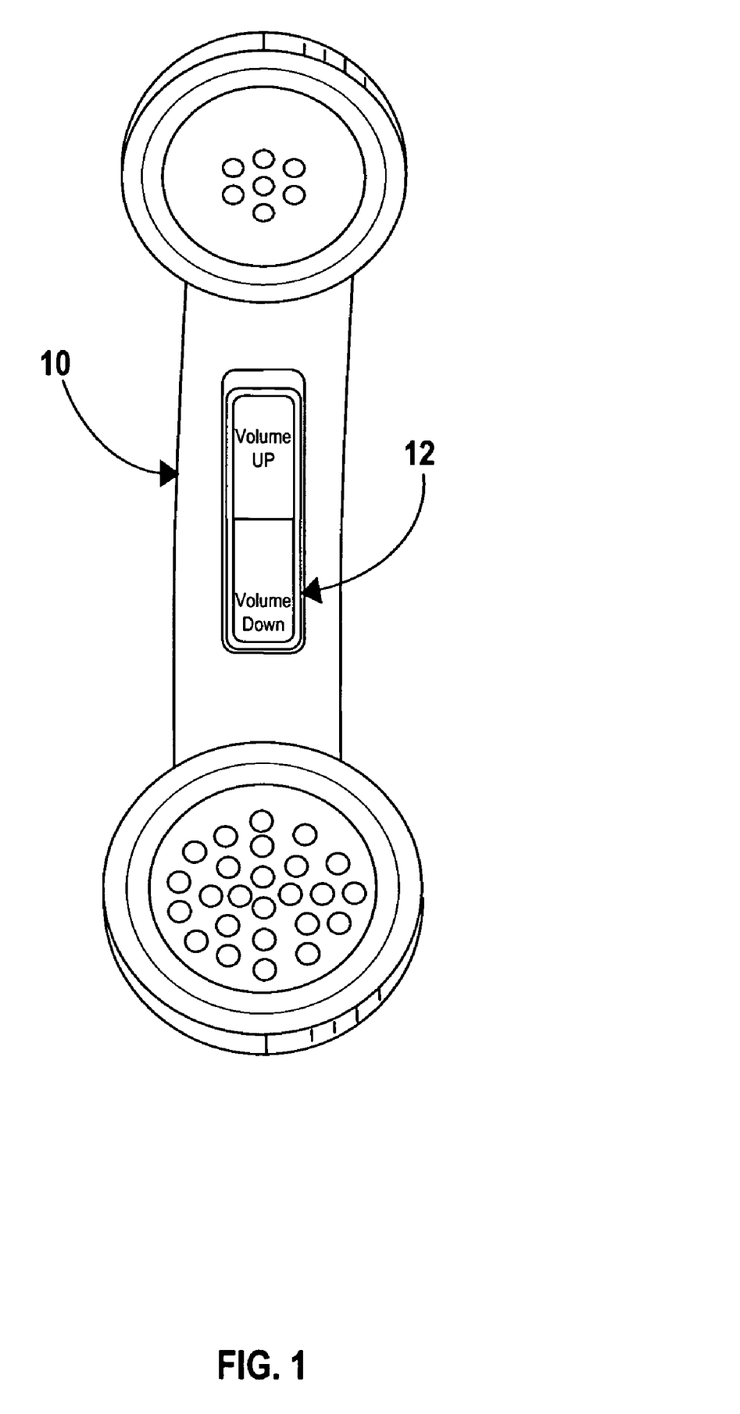
FIG. 1 is a typical telephone handset that can be used in the implementation of the present invention.

The present invention describes a method and system for automatically adjusting the volume of the telephone of one party based on an adjustment of the volume at a connected telephone during a telephone call. This invention initially involves modifying a telephone handset such that the telephone can detect, transmit and receive changes in volume of a connected telephone. FIG. 1 shows a typical telephone handset. The telephone apparatus in this invention description is of a conventional telephone having a base and a handset, however, the telephone apparatus of this invention also comprises and includes other telephone devices such as one-piece telephones (cord/cordless headsets), cellular telephones, Bluetooth Headsets (which include a microphone and speakers which are remote from a telephone headset). It is noted that although some telephone devices comprise multiple component systems, for purposes of this invention, these multiple component telephone systems function as one single telephone apparatus. In addition, for purposes of describing this invention, reference is made to calling party and called party. However, either the calling party or called party can implement the techniques described in this invention.

Shown in this telephone handset 10, is a volume adjustment control 12. A telephone unit is fitted with firmware to communicate volume control information to a connected telephone. The volume setting can be a range for example from 0 through 100, where 0 is totally quiet, and the value 100 is the highest setting. The firmware can also accept and process volume control values from a connected telephone. The firmware can be in the handset of the telephone such as shown in FIG. 1 or it can be placed in the base of the telephone. Many telephones today are only comprised of the handset.

Figure 2:
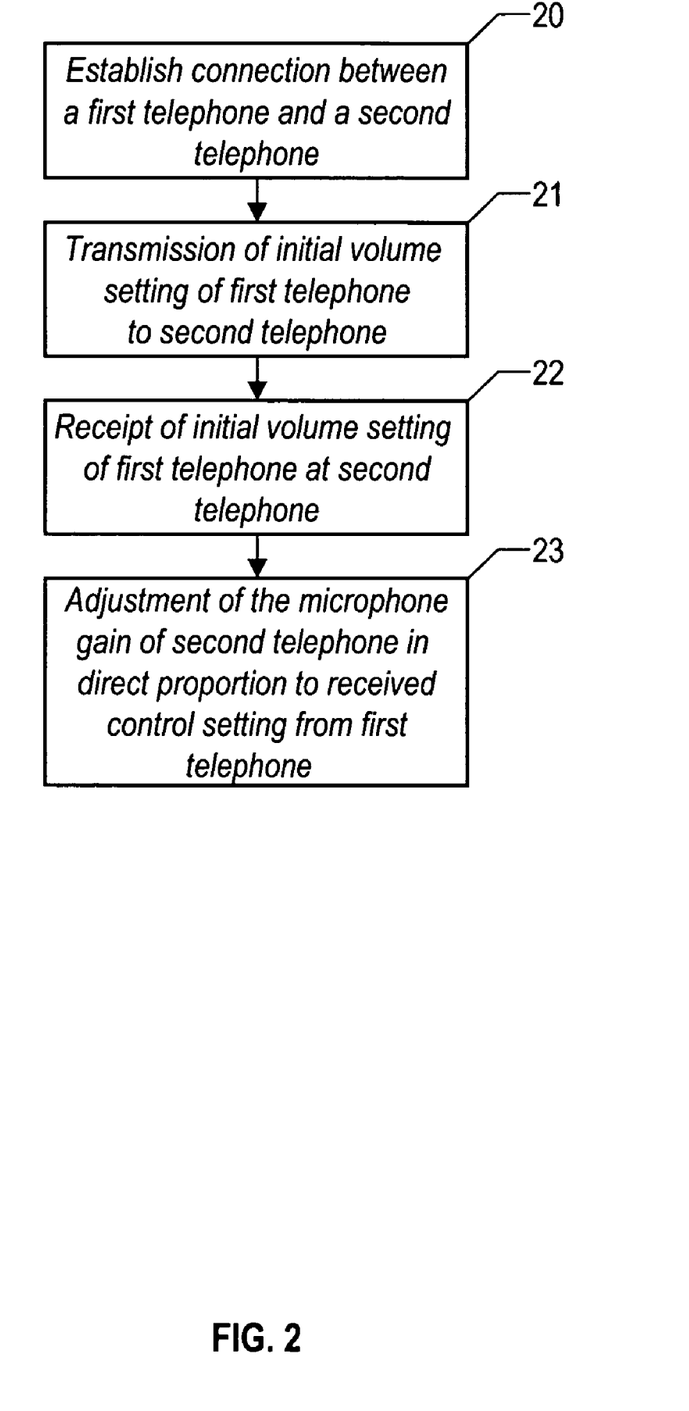
FIG. 2 is a flow diagram of the general steps of the present invention.

FIG. 2 is a flow diagram of the general steps of the present invention. In step 20, a telephone connection is established between two or more parties. In some situations such as three-way calls or conference calls there are more than two parties connected in the telephone conversation. For the purposes of the description herein, the discussion is from the standpoint of a conventional two-party telephone conversation. However, the techniques, devices and concepts of the present invention also apply to multiple party telephone conversations such as conference calls. In step 21, upon establishing a telephone connection, the first telephone unit ("the caller") transmits its initial volume control setting to the second unit ("the receiver"). In step 22, the second telephone unit receives the volume control value from the first unit. Step 23 adjusts microphone gain in the telephone of the receiver party (second telephone) in direct proportion to the received volume control value. For example, sending an initial 50% value from the first telephone causes the second telephone to adjust its volume setting to a value that is proportional to the value of the first (sending) telephone. When the caller at the first telephone unit increases or decreases the volume, a message is transmitted to the called party at the second telephone unit, specifying the value increase or decrease. The second telephone unit receives the value, and adjusts the microphone gain value by a corresponding amount. Referring to steps 21, 22 and 23, in an alternate embodiment of this step, a connected party, when the connection is established, can simultaneously send volume control information to the other party sending the initial volume settings. The party sending the initial volume settings can, upon receipt of the volume settings from the other party, adjust its microphone gain in correspondence to the volume setting of the other party.

Figure 3:
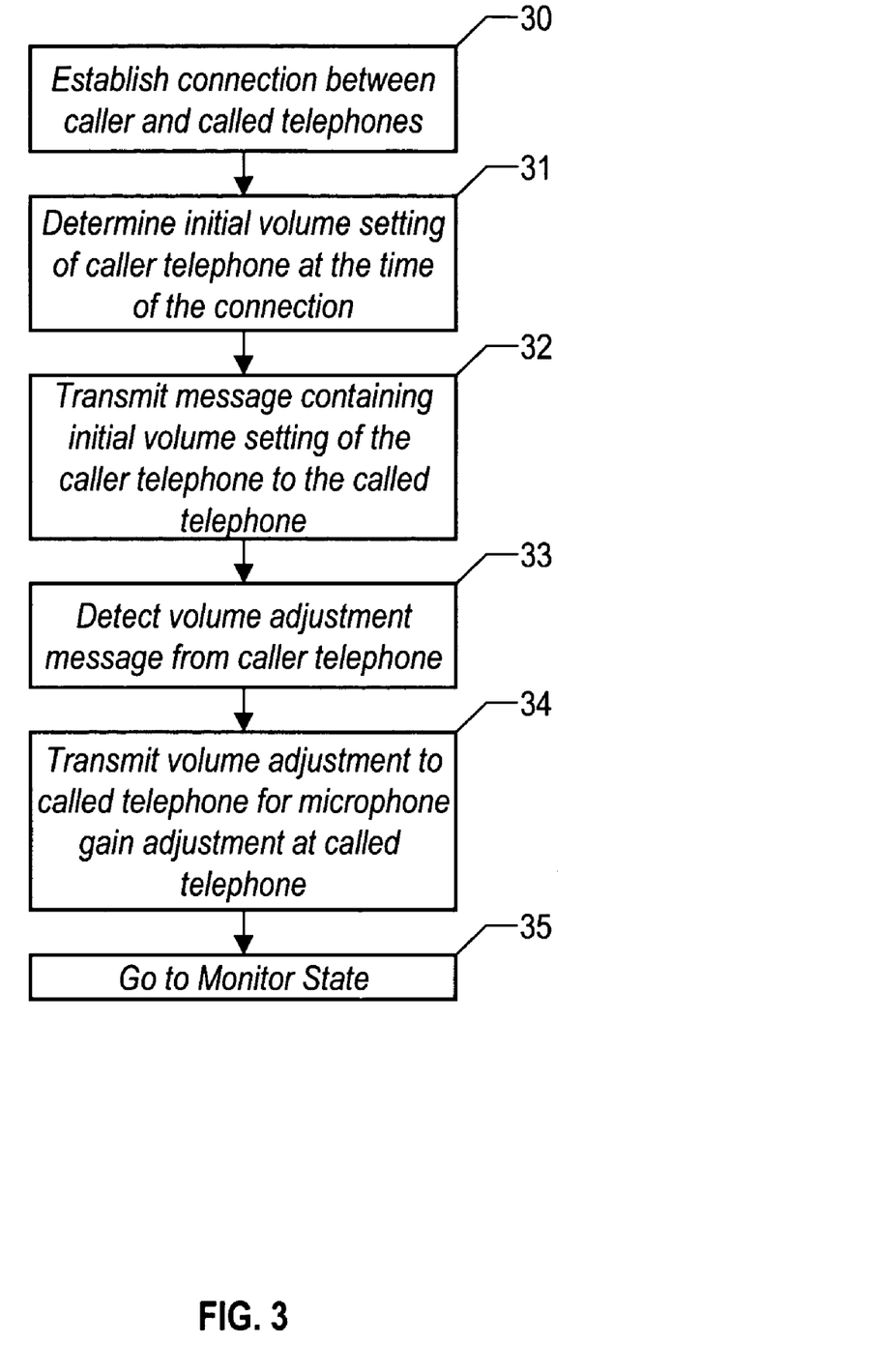
FIG. 3 is a detailed flow diagram of the steps in the initial setting of the volume.

FIG. 3 is a more detailed flow diagram of the steps of the present invention. As shown, step 30 establishes a connection between the caller telephone and a called telephone. The telephone connection can also activate a software/firmware process stored in both the caller and called telephones. With reference to the caller, at this point, there would a determination of the initial volume setting of the caller party telephone in step 31. This volume determination step can be a simple technique of electronic sensing of the volume level. An alternative is a default volume established at the time of the initial connection. Step 32 formulates and transmits the initial volume value to the called telephone.

At the called location, step 33 detects the volume adjustment message transmitted from the caller telephone. At this point, step 34 makes the volume adjustment in the called telephone. The called telephone then goes into a monitor state 35 and waits for any additional volume adjustments during the call.

Figure 4:
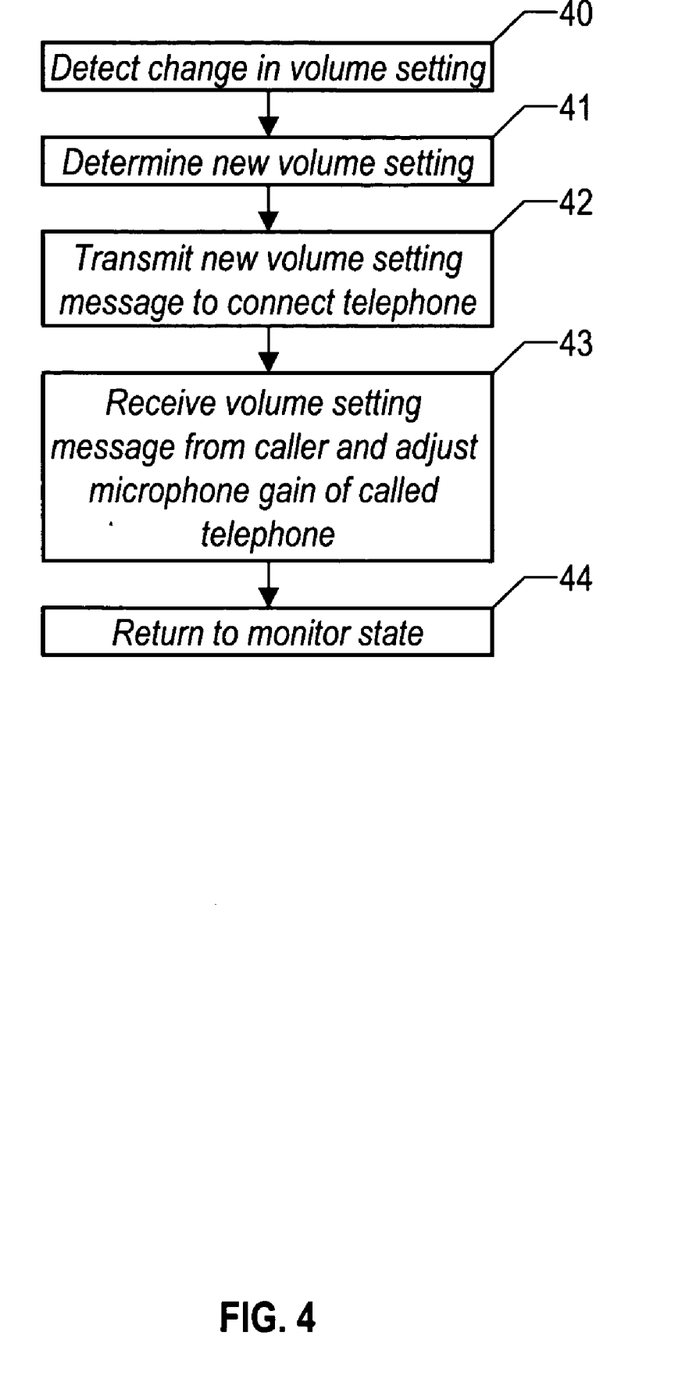
FIG. 4 is a detailed flow diagram of the steps of the present invention during a volume adjustment procedure.

FIG. 3 illustrated the steps in establishment of the initial telephone volume. FIG. 4 is a detailed flow diagram of the steps of the present invention during a volume adjustment procedure. During the call, software/firmware in both the caller and the called locations is in a monitor state. If either party decides to adjust the volume, that party can move the volume control button, usually a potentiometer shown in FIG. 1. Step 40 will sense/detect a change in the volume setting. As mentioned a conventional sensing device within the handset will detect this change. After detecting the adjustment in volume, step 41 determines the extent of the volume adjustment. This adjustment determination will produce a new volume setting value. In step 42, this new volume setting is automatically sent to the called telephone. In step 43, the called telephone receives the transmitted volume and adjusts the volume of the called telephone. After the completion of the volume adjustment, step 44 returns the process to a monitor state. At the completion of the call, the software in the receiver will detect a disconnection and will terminate the process in the receiver. At this point, the volume of the telephones can remain at the last volume of the call or can return to a default setting.

Figure 5:
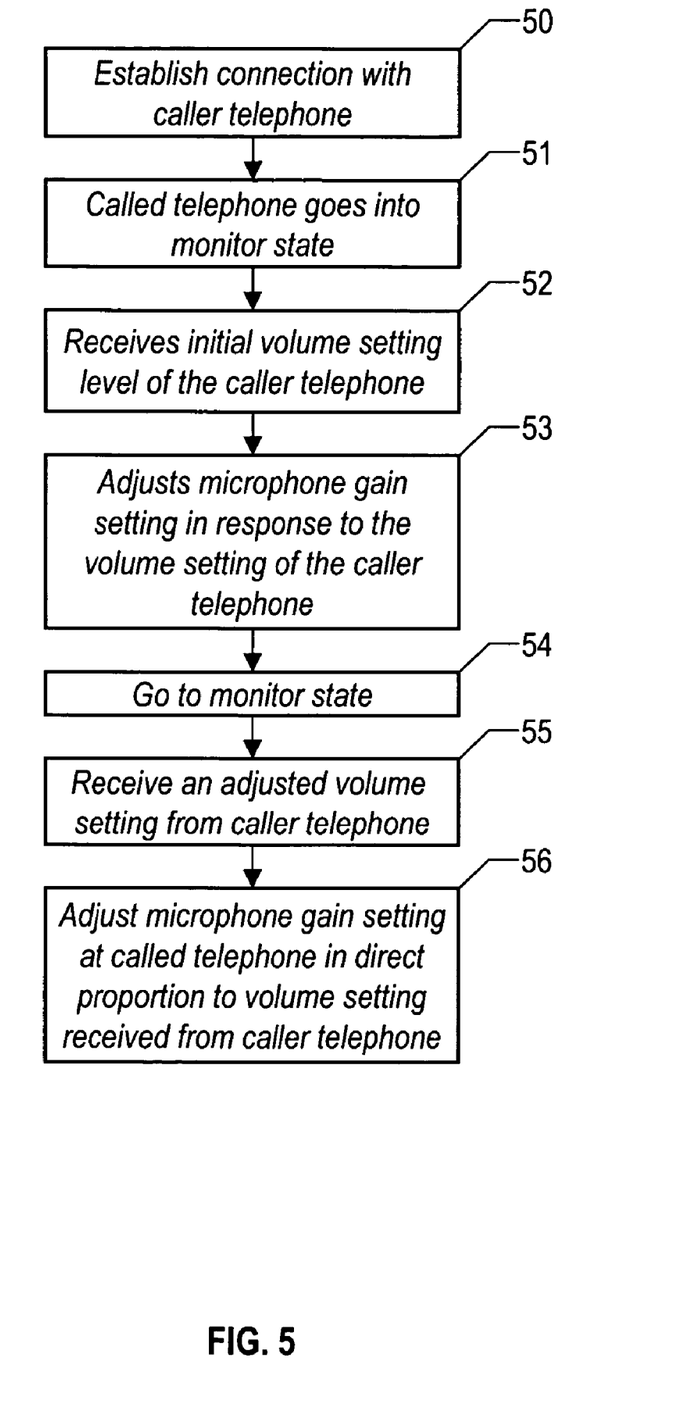
FIG. 5 is a flow diagram of the steps at the called telephone location in accordance with the steps of the invention.

FIG. 5 is a flow diagram of the steps at the called telephone location in accordance with the steps of the invention. As shown, in step 50, a connection is established between the caller and called telephones. At the establishment of the connection, the called telephone will go into a monitor state in step 51 in anticipation of receiving one or more messages from the caller telephone. In step 52, the called telephone will receive the initial volume level of the caller telephone. At this point, in step 53 the called telephone will adjust its volume in direct proportionally to the caller volume level. After the adjustment of the volume to the initial setting of the caller, the receiver goes back into the monitor state in step 54. If a caller adjusts the telephone volume, this adjustment is detected and transmitted to the receiver. In step 55, the receiver detects the volume adjustment message and in step 56 makes the volume adjustment based on the information contained in the caller message. At the completion of this volume adjustment, the method returns to the monitor state 54.

Figure 6:
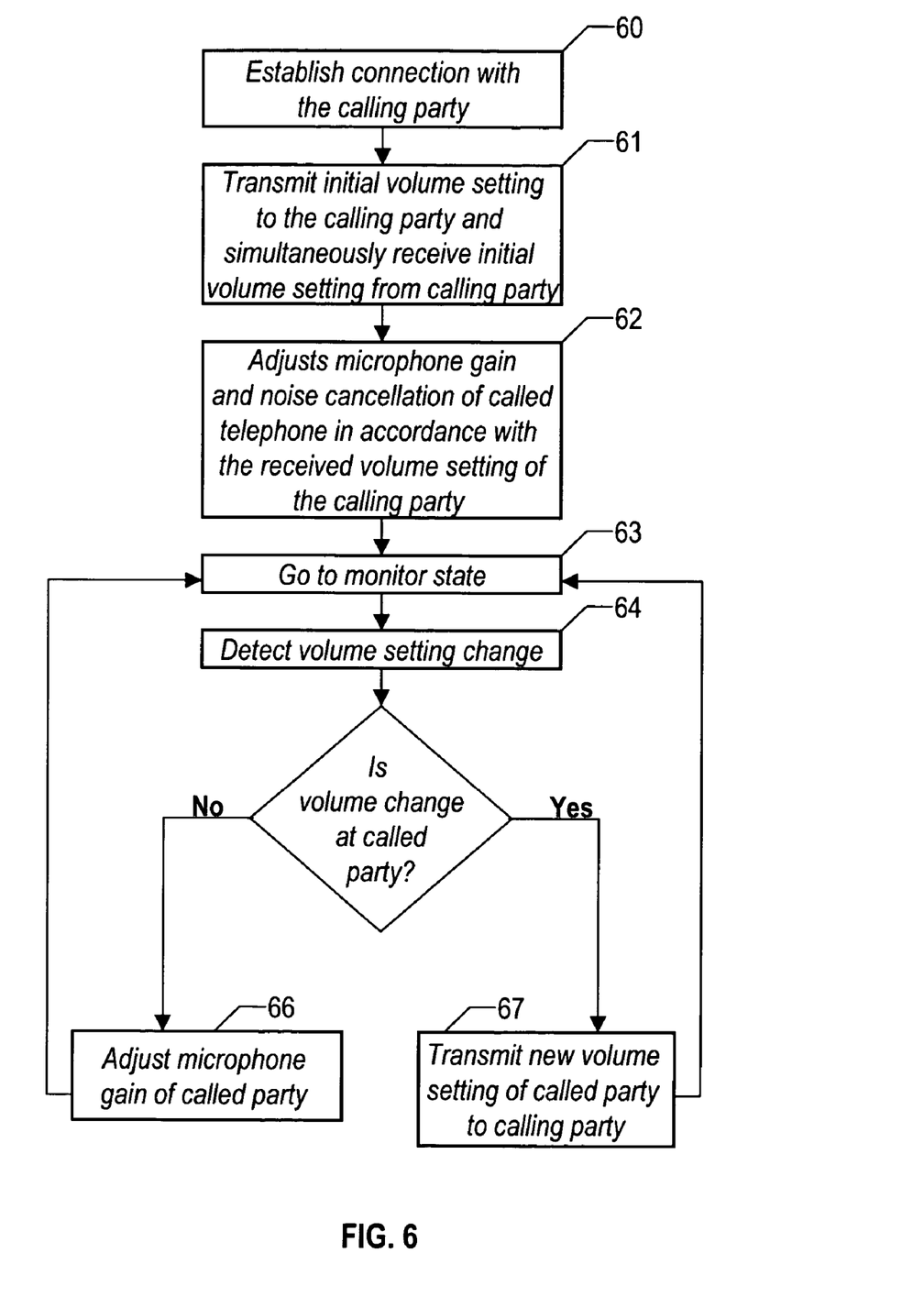
FIG. 6 is a flow diagram of the steps of the present invention when the called transmits an initial volume setting to the called party.

FIG. 6 is a flow diagram of the steps of the present invention when the called party also transmits an initial volume setting to the calling party. In step 60, the connection is established between the calling party and the called party. Following the connection, both the calling and called parties can simultaneously transmit initial volume settings to the other party in step 61. These initial volume settings are received by the designated telephone party location. In step 62, the each telephone location makes adjustments to the microphone gain in response to the received initial volume setting of the other party. At the completion of the microphone gain and noise cancellation adjustment, the called telephone (and the calling telephone) goes to a monitor state in step 63. The telephone remains in the monitor state during the conversation. If there is a volume setting change, at either the called telephone or calling telephone, it is detected in step 64.

At this point, step 65 will determine if the volume setting change is from the called party or calling party. If the volume setting is from the calling party, the change is detected by a message transmitted to the called party. In this case, the method moves to step 66 where the microphone gain and noise cancellation of the called party is adjusted in response to the received volume change. After the adjustment of the microphone gain, the method moves back to the monitoring state in step 63. If the determination in step 65 is that the volume change is from the called party, a message is sent to the calling party in step 67 containing the new volume setting of the called party telephone. Once received at the calling party, the calling party will adjust its microphone gain in response to the new volume setting of the calling party.

In the present invention, there are various ways to implement the volume control process. In one example, when the user of the first microphone unit adjusts the volume control by holding the volume control for longer than a predetermined amount of time (e.g., 40 milliseconds), a calculation is made to generate a volume value according to a predefined time period. For example, holding the volume control up for 500 ms will increase the present volume value 25%, while holding the control up for 1000 ms will increase the volume value 100%. Double tapping the volume control on the first unit will reset the volume value to default value. Accordingly a message is sent to the second telephone unit to reset the microphone gain to the default value. When the telephone conversation ends, each telephone unit reverts back to the default settings for that unit.

Figure 7:
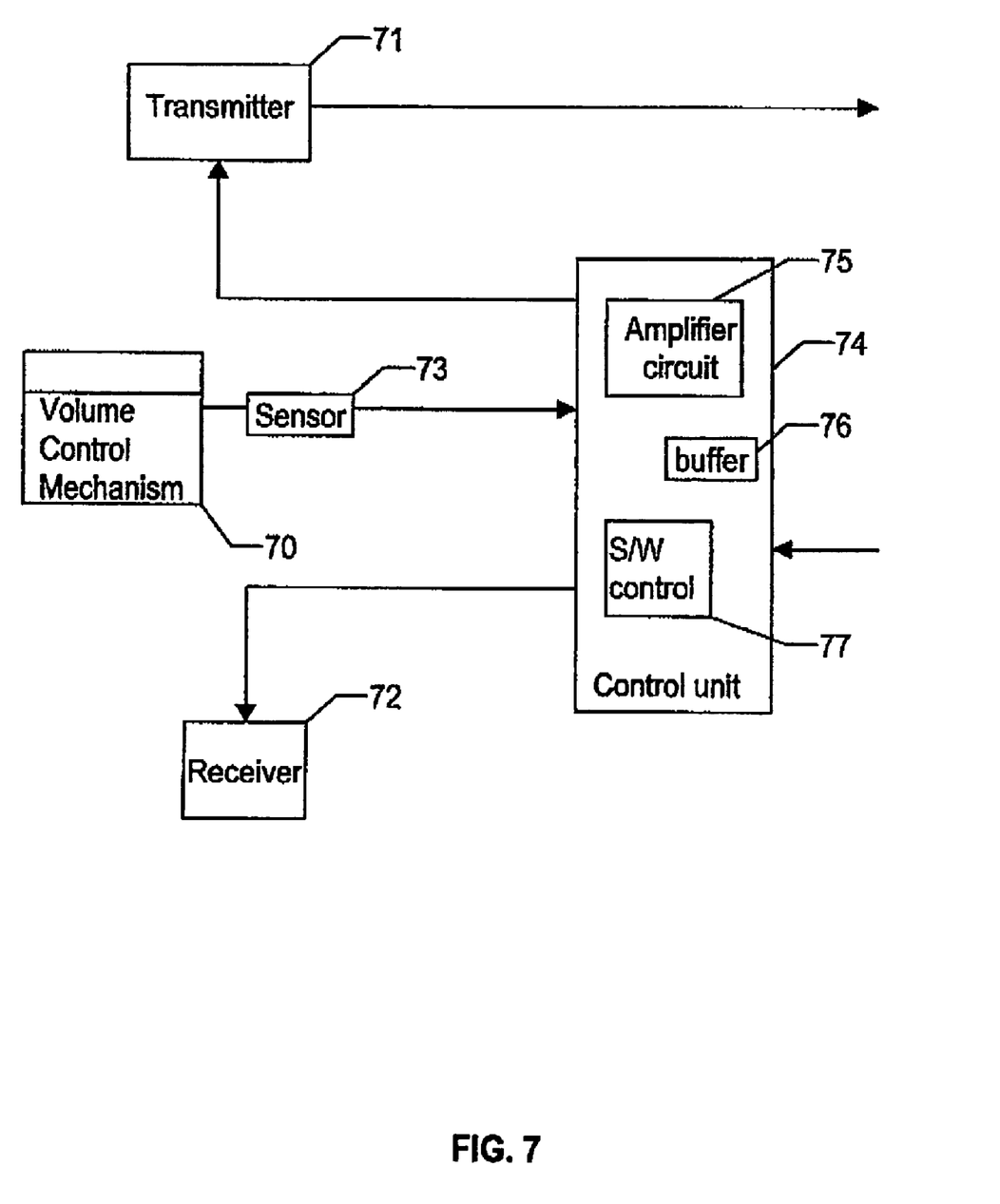
FIG. 7 is a configuration of an embodiment of the system of the present invention.

FIG. 7 illustrates a configuration of the system of the present invention. This system can be contained in a telephone handset. The system comprises a volume control mechanism 70. This volume control can be positioned in the handset similarly to the volume control mechanism illustrated in U.S. Pat. No. 4,466,120. The handset contains a transmitter 71 and a receiver 72. The transmitter and receiver are standard components in any telephone handset. Connected to the volume control is a sensor 73, This sensor can be connected to the volume control mechanism such that it will detect changes in volume control mechanism. The sensor 73 is also connected to a central control unit 74. This control unit is also connected to the transmitter 71 and receiver 72. The central control unit can contain the amplifier circuit 75 used to amplify signals going into the receiver and signals coming from the transmitter. This amplifier circuit can be of a conventional design. The central control unit also contains a memory buffer 76 and control software 77. The memory buffer can contain the present volume state of the handset. This present state volume is used when determining the amount of the gain change there has been to telephone volume. The processor contains the software 77 that controls the volume adjustments and transmissions during a telephone conversation.

During the operation of the present invention, a user may adjust the volume control mechanism 70. At this point, the sensor will detect the volume change and send a signal to the central control unit 74. This signal can contain the new volume set by the user. The central control unit will receive the signal and determine the amount of volume change that has occurred through the adjustment of the volume control mechanism 70. The processor will also determine whether the volume change was an increase or decrease. For example, if the user changes the volume from 5 to 6 on the volume scale, which ranges from 0 to 10, this change represents a ten percent increase in the volume. The sensor would send a signal to the central control indicating that the new volume is 6. The central control would receive this new volume and compare it to the present state volume value 5 that is stored in the memory buffer 76. At this point, the gain in the amplifier circuit would increase by 10 percent thereby increasing the volume of signals coming into the receiver 72 and signals going out through the transmitter 71. In addition, the software 77 would transmit this volume change to the other connected telephone party. The volume adjustment from 5 to 6 that occurred in the first telephone would then occur in the recipient telephone. In addition, as previously described, the initial volume of the caller telephone is transmitted to the recipient telephone in the same manner as a volume adjustment during the telephone conversation.

As shown, the central control will transmit this volume change from the telephone initiating the volume change to the other connected telephone. The central control can be internally connected to the transmitter and receiver such that the volume adjustment information are included in the signals going from the transmitter and coming into the receiver. In this configuration, the central unit would receive the incoming signal along with the receiver. Also, the central unit could transmit the signal from the transmitter to the other connected telephone party. The volume adjustment signal could be transmitted at a different frequency from the telephone conversation information. A central control unit could also contain a filter that could filter out the volume adjustment information before the signal reached the signal amplifier. The incoming signal would then pass through a filter in order to remove the volume adjustment information prior to the signal pass through the amplifier circuit. The volume adjustment signal could contain an initial pulse to alert the central control that volume adjustment information is to follow.

An incoming signal would contain the telephone conversation information and any volume adjustment information. As the signal comes into the telephone it would pass through the central control. The central control would detect any signal in the volume adjustment frequency range. If there is a signal in the volume adjustment frequency range, this information is detected and processed to determine a new volume in accordance with the volume adjustment of the sending telephone.

It should be noted that even though the present invention operates using digital messaging between the first and second telephone units, other embodiments are within the spirit of this invention. For example, the first unit may send touch-tones instead of digital messages, which when received by the second telephone unit will process the corresponding microphone gain.

Figure 8:
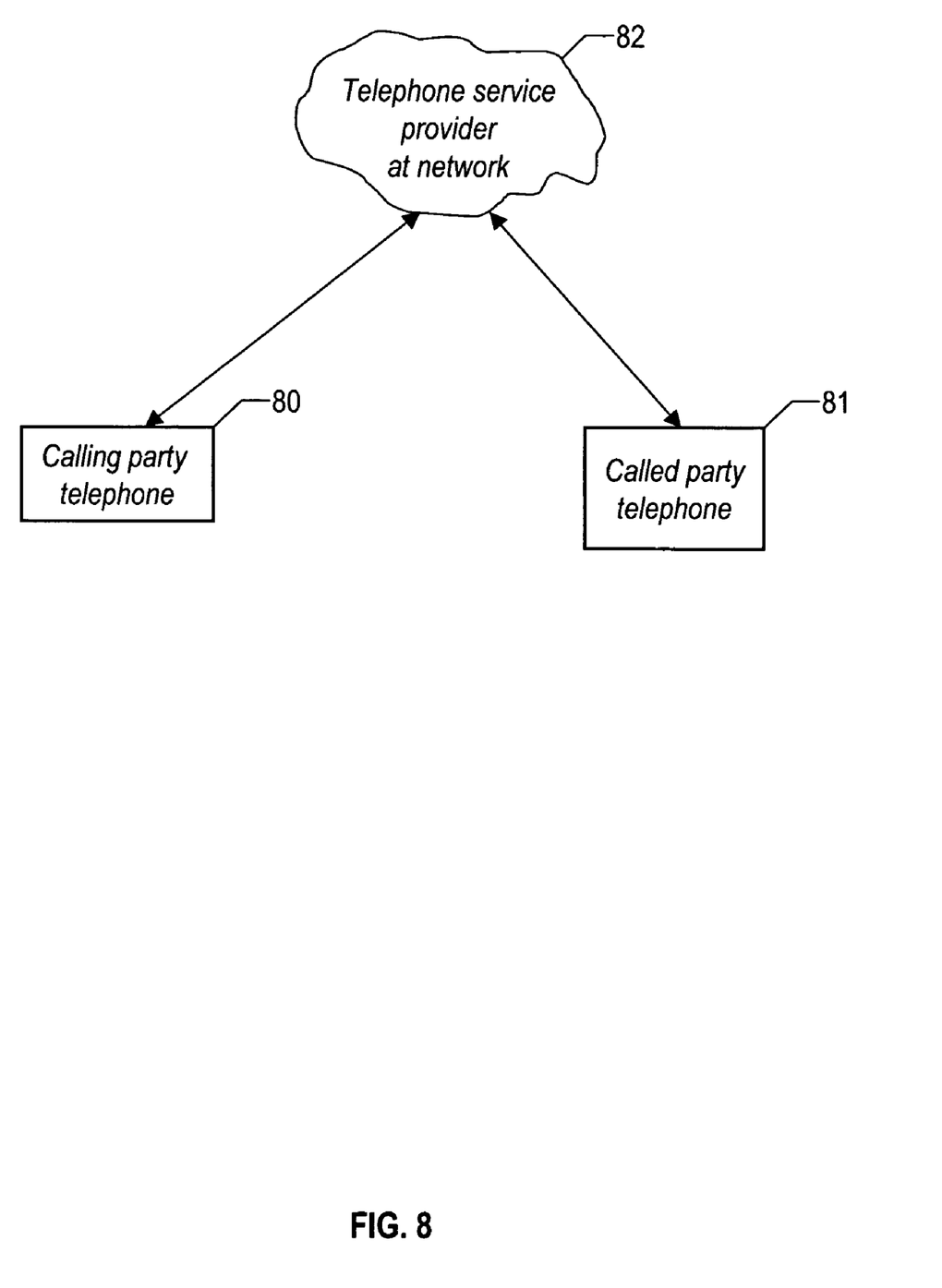
FIG. 8 is a configuration of a telephone network system in which volume and microphone gain settings occur at a central location in the network.

Referring to FIG. 8, shown is a network configuration in which the transmission of the volume adjustment of a telephone would pass through a central switch instead of at the actual telephone units. As shown, telephone 80 and telephone 81 are connected via a central switch 82. In this embodiment, a volume change at telephone unit 80 is detected at the network switch 82 and transmitted to the telephone unit 81. The network switch is able to determine the amount of microphone gain adjustment that is necessary at a telephone unit in order to adequately respond to a volume adjustment at a connected telephone. The embodiment illustrated in FIG. 8 could provide the advantage of simpler implementation in that individual telephone units would not need substantial modification to implement the present invention.

In addition to the above-described features, the present invention can also have directory that matches specific volume settings with certain telephone number and callers. This system may be desirable in cases where one regular caller has a hearing impairment or one caller talks particularly loud of soft. This feature will store the caller information including caller telephone, and volume settings in a caller memory similarly to speed dialing features currently in many telephone devices. When a caller clicks a number in the directory, that number is dialed. In addition, the volume settings for that caller are transmitted to the call recipient. In addition, if the called party also has specific volume settings, those settings are transmitted to the calling party.

It is important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape, paper, floppy disc, hard disk drive, RAM, and CD-ROMs and transmission-types of media, such as digital and analog communications links.

Having thus described the invention, what we claim as new and desire to secure by Letters Patent is set forth in the following claims.

We claim:

1. A method for adjusting the microphone gain of a connected telephone from a remote location comprising the steps of:
    establishing a connection between two or more telephones thereby creating a system of connected telephones;
    transmitting a present volume setting of a first telephone to one or more connected telephones in the system; and
    adjusting a microphone gain and noise cancellation setting at the one or more connected telephones in accordance with the transmitted volume setting from the first telephone that is received at the one or more connected telephones, the microphone gain and noise cancellation being adjusted in direct proportion to the received volume setting from the first telephone.

2. The method as described in claim 1 further comprising before said transmitting step, the step of detecting a volume setting change at the first telephone and determining the amount of the change in the volume setting from the current volume setting.

3. The method as described in claim 2 further comprising before said detecting step, the step of transmitting an initial volume setting to the one or more connected telephones.

4. The method as described in claim 3 further comprising the steps of:
    detecting a change in the volume setting;
    adjusting the microphone gain and noise cancellation of signals from the transmitter and the volume of signals going to the receiver of the first telephone; and
    transmitting the adjusted volume setting of the first telephone to the connected telephone.

5. The method as described in claim 2 further comprising the step of storing the volume setting change in a storage buffer such that the stored volume setting becomes the current volume setting of the telephone.

6. The method as described in claim 2 wherein said detecting step further comprises comparing the changed volume setting to the stored volume setting such that the difference between the two volume settings is the amount of the percentage of change in the volume settings.

7. A method for adjusting the microphone gain of a connected telephone from a remote location comprising the steps of:
  establishing a connection between two or more telephones thereby creating a system of connected telephones;
  transmitting a present volume setting of a first telephone to one or more connected telephones in the system; and
  adjusting a microphone gain setting at the one or more connected telephones in accordance with the transmitted volume setting from the first telephone that is received at the one or more connected telephones;
  receiving at the first and any other telephones connected in the system, a volume setting change transmitted from a connected telephone in the system; and
  adjusting microphone gain and noise cancellation settings of the connected telephones receiving the transmitted volume setting change of the transmitting telephone, the adjustment being in direct proportion to the transmitted volume setting change of the transmitting telephone.

8. A method for adjusting the microphone gain of a connected telephone from a remote location comprising the steps of:
  establishing a connection between two or more telephones thereby creating a system of connected telephones;
  transmitting a present volume setting of a first telephone to one or more connected telephones in the system; and
  adjusting a microphone gain setting at the one or more connected telephones in accordance with the transmitted volume setting from the first telephone that is received at the one or more connected telephones;
  in response to a detection of a volume setting change at a connected telephone, transmitting the volume setting change to the first telephone and any other connected telephones in the system; and
  adjusting microphone gain and noise cancellation settings of the connected telephones receiving the transmitted volume setting change of the transmitting telephone, the adjustment being in direct proportion to the transmitted volume setting change of the transmitting telephone.

9. The method as described in claim 8 further comprising the step of storing in each connected telephone in the system a microphone gain and noise cancellation setting for each of the other telephones connected in that system such that each connected telephone contains multiple microphone gain and noise reduction settings, one setting corresponding to each connected telephone in the system.

10. A computer program product for adjusting the microphone gain of a connected telephone from a remote location comprising:
  instructions for establishing a connection between two or more telephones thereby creating a system of connected telephones;
  instructions for transmitting a present volume setting of a first telephone to one or more connected telephones in the system; and
  instructions for adjusting a microphone gain setting at the one or more connected telephones in accordance with the transmitted volume setting from the first telephone that is received at the one or more connected telephones
  receiving at the first and any other telephones connected in the system, a volume setting change transmitted from a connected telephone in the system; and
  adjusting microphone gain and noise cancellation settings of the connected telephones receiving the transmitted volume setting chance of the transmitting telephone, the adjustment being in direct proportion to the transmitted volume setting change of the transmitting telephone.

11. The computer program product as described in claim 10 further comprising before said transmitting instructions, instructions for detecting a volume setting change at the first telephone and determining the amount of the change in the volume setting from the current volume setting.

12. The computer program product as described in claim 11 further comprising before said detecting instructions, instructions transmitting an initial volume setting to the one or more connected telephones.

13. The computer program product as described in claim 10 further comprising the instructions for storing in each connected telephone in the system a microphone gain end noise cancellation setting for each of the other telephones connected in that system such that each connected telephone contains multiple microphone gain and noise reduction settings, one setting corresponding to each connected telephone in the system.

14. A computer program product for adjusting the microphone gain of a connected telephone from a remote location comprising:
  instructions for establishing a connection between two or more telephones thereby creating a system of connected telephones;
  instructions for detecting a volume setting change at the first telephone and determining the amount of the change in the volume setting from the current volume setting;
  instructions for adjusting the microphone gain and noise cancellation of signals going to the transmitter and volume signals from the receiver of the first telephone;
  instructions for transmitting a present volume setting of a first telephone to one or more connected telephones in the system;
  instructions for adjusting a microphone gain setting at the one or more connected telephones in accordance with the transmitted volume setting from the first telephone that is received at the one or more connected telephones;
  instructions for transmitting the adjusted volume setting of the first telephone to the connected telephone.

15. A telephone system comprising a telephone apparatus capable of affecting the volume of a connected telephone, the telephone apparatus of the system comprising:
  a telephone handset;
  a volume adjustment mechanism;
  a telephone transmitter for sending signals from the telephone;
  a telephone receiver for receiving signals at the telephone; and
  a volume control unit contained in the telephone, said volume control unit being connected to said volume adjustment mechanism, said volume control unit capable of detecting volume settings and generating volume setting information for transmission to a connected telephone, said volume control unit also capable of interpreting volume settings received from a connected telephone and generating microphone gain and noise cancellation adjustments based on the received volume setting information from a connected telephone.

16. The system as described in claim 15 wherein said volume control unit comprises:

a volume adjustment sensor for detecting changes in the volume level;

a processor for receiving a signal from said sensor when a change in the volume level is detected by said sensor and for determining the percent of change of a volume level when a change in the volume level is detected;

an amplifier for amplifying the volume level of a telephone signal; and a noise cancellation unit.

17. The system as described in claim 15 further comprising one or more telephone apparatuses telephone apparatus connected to said telephone apparatus, said one or more telephone apparatuses also comprising:

a telephone handset;

a volume adjustment mechanism;

a telephone transmitter for sending signals from the telephone;

a telephone receiver for receiving signals at the telephone; and a volume control unit contained in the telephone, said volume control unit being connected to said volume adjustment mechanism, said volume control unit capable of detecting volume settings and generating volume setting information for transmission to a connected telephone, said volume control unit also capable of interpreting volume settings received from a connected telephone and generating a microphone gain and noise cancellation adjustments based on the received volume setting information from a connected telephone.

18. The system as described in claim 17 wherein a telephone apparatus connected in the system further comprises a directory of settings containing settings for specific telephone apparatuses.

* * * * *